United States Patent
Feldhues et al.

(10) Patent No.: US 6,881,830 B2
(45) Date of Patent: Apr. 19, 2005

(54) METAL COMPLEXES

(75) Inventors: Ulrich Feldhues, Bergisch-Gladbach (DE); Frank Linke, Köln (DE); Ronald Göbel, Leverkusen (DE); Udo Herrmann, Dormagen (DE); Sabine Endert, Wuppertal (DE)

(73) Assignee: Bayer Chemicals AG, Leverkusen (DE)

( * ) Notice: Subject to any disclaimer, the term of this patent is extended or adjusted under 35 U.S.C. 154(b) by 160 days.

(21) Appl. No.: 10/396,627

(22) Filed: Mar. 25, 2003

(65) Prior Publication Data

US 2003/0187108 A1 Oct. 2, 2003

(30) Foreign Application Priority Data

Mar. 28, 2002 (DE) .......................... 102 13 982

(51) Int. Cl.⁷ .......... C09B 45/00; C09B 45/22; C09B 67/20
(52) U.S. Cl. .......... 534/602; 534/707; 106/496
(58) Field of Search .............. 534/602, 707; 106/496; 524/100; 8/466, 685

(56) References Cited

U.S. PATENT DOCUMENTS

| 3,869,439 A | 3/1975 | Schundehutte | 260/146 |
| 4,628,082 A | 12/1986 | Lorenz et al. | 534/707 |
| 6,077,339 A | 6/2000 | Nyssen et al. | 106/31.77 |
| 6,211,346 B1 | 4/2001 | Linke et al. | 534/707 |
| 6,261,358 B1 | 7/2001 | Sommer et al. | 106/496 |
| 6,350,307 B1 | 2/2002 | Linke et al. | 106/496 |
| 2001/0047087 A1 | 11/2001 | Harrmann et al. | 534/15 |
| 2002/0034696 A1 * | 3/2002 | Wolf et al. | 430/7 |

FOREIGN PATENT DOCUMENTS

| DE | 195 35 246 A1 | 3/1997 |
| EP | 0074515 | 3/1983 |

* cited by examiner

*Primary Examiner*—Fiona T. Powers
(74) *Attorney, Agent, or Firm*—Godfried R. Akorli; Diderico van Eyl; Jill Denesvich

(57) ABSTRACT

Metal complexes of metals of the scandium group with an azo compound which conforms to the formula (I) or to one of its tautomeric structures

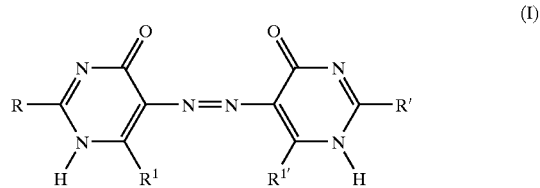

where
R is OH, $NH_2$, NH—CN, arylamino or acylamino,
R' is $NH_2$, NH—CN, arylamino or acylamino and
$R^1$ and $R^{1'}$ are independently —OH or —$NH_2$.

16 Claims, No Drawings

METAL COMPLEXES

BACKGROUND OF THE INVENTION

1. Field of the Invention

The invention relates to the use of metal complexes as pigments, to new metal complexes and to a process for preparing them.

2. Brief Description of the Prior Art

EP-A 994 163 discloses metal complex pigments which additionally contain an intercalated compound. These intercalated compounds have in some instances very good light fastnesses, but relatively low colour strengths due to the intercalation. Their preparation, therefore, requires an additional synthetic step.

It is an object of this invention to provide further pigments which, without intercalation of organic or inorganic compounds, have excellent light fastnesses coupled with high colour strengths.

SUMMARY OF THE INVENTION

The invention, then, relates to the use of metal complexes conforming to complexes of metals of the scandium group with an azo compound, to the formula (I) or to one of its tautomeric structures

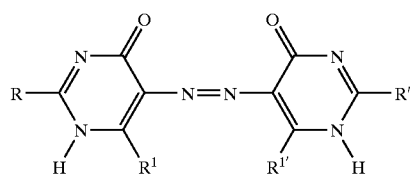

(I)

where

R is OH, $NH_2$, NH—CN, arylamino or acylamino,

R' is $NH_2$, NH—CN, arylamino or acylamino and $R^1$ and $R^{1'}$ are independently —OH or —$NH_2$ as pigments.

The metal complexes are preferably used as pigments for colouring natural, semisynthetic or synthetic organic or inorganic materials.

DETAILED DESCRIPTION OF THE INVENTION

Aryl substituents in the formula (I) are preferably phenyl or naphthyl, which may each be substituted for example by halogen such as F, Cl, Br, OH, $C_1$–$C_6$-alkyl, $C_1$–$C_6$-alkoxy, —$NH_2$, —$NO_2$ and —CN.

Acyl substituents in the formula (I) are preferably ($C_1$–$C_6$-alkyl)carbonyl, phenylcarbonyl, $C_1$–$C_6$-alkylsulphonyl, phenylsulphonyl, optionally $C_1$–$C_6$-alkyl-, phenyl- and naphthyl-substituted carbamoyl, optionally $C_1$–$C_6$-alkyl-, phenyl- and naphthyl-substituted sulphamoyl or optionally $C_1$–$C_6$-alkyl-, phenyl- or naphthyl-substituted guanyl, where the alkyl radicals mentioned may be substituted for example by halogen such as Cl, Br, F, —OH, —CN, —$NH_2$ or $C_1$–$C_6$-alkoxy and the phenyl and naphthyl radicals mentioned may be substituted for example by halogen such as F, Cl, Br, —OH, $C_1$–$C_6$-alkyl, $C_1$–$C_6$-alkoxy, —$NH_2$, —$NO_2$ and —CN.

The scandium group encompasses the metals scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu).

Particularly preferred metal complexes are complexes of the metals Y, La, Ce, Pr and Nd, each in the trivalent oxidation state, more preferably Ce, Pr and Nd, and most preferably Ce.

The term "metal complexes" as used herein encompasses metal salts as well.

Preference is given to organic metal complexes of those azo compounds of the formula (I) which in the form of their free acid conform to the formula (IIa) or (IIb) or to one of its tautomeric structures

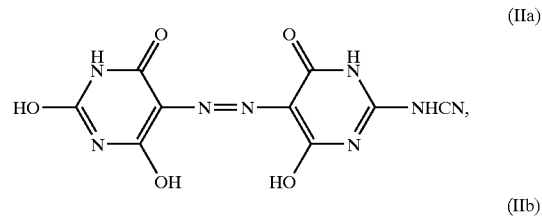

Preference is likewise given to those metal complexes of the formula (I), especially those of the formulae (IIa) and (IIb) where the metal complex contains one azo unit per central atom from the scandium group (so-called 1:1 complexes).

Very particular preference is given to those metal complexes, especially those of the formulae (IIa) and IIb) where the metal complex contains two azo units per central atom Z from the scandium group (so-called 2:1 complexes).

They more preferably conform in the form of their free acid to the formula (IIIa) or (IIIb) or to one of its tautomeric structures

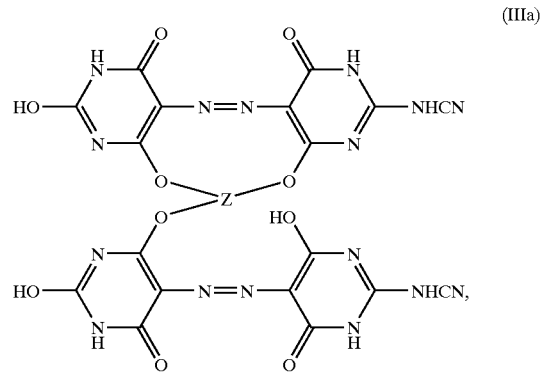

(IIIa)

-continued

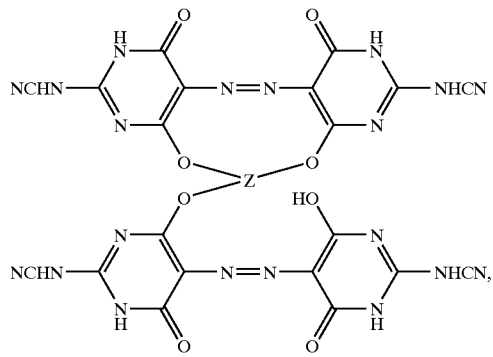

(IIIb)

where
Z is Sc, Y, La, Ce, Pr, Nd, Pm, Sm Eu, Gd, Tb, Dy, Ho, Er, Tm, Yb or Lu.

The inventive use of the metal complexes concerns in principle all pigment applications. Preference is given to the use for pigmenting varnishes of all kinds for producing printing colours, distemper colours or binder colours, for the mass coloration of synthetic, semisynthetic or natural macromolecular substances, for example polyvinyl chloride, polystyrene, polyamide, polyethylene or polypropylene. They can also be used for the spin dyeing of natural, regenerated or artificial fibres, for example cellulose, polyester, polycarbonate, polyacrylonitrile or polyamide fibres and also for printing textiles and paper. These pigments can be converted, by grinding or kneading in the presence of nonionic, anionic or cationic surfactants, into finely divided, stable, aqueous pigmentations of dispersion and paint colours which are useful for paper coloration, for the pigment printing of textiles, for laminate printing or for the spin-dyeing of viscose.

Particular preference is given to the use of the metal complexes as a pigment for laminate, as a pigment for use in colour filters for LCDs and also as a pigment for inkjet printing.

In general, the metal complex compound forms a layered crystal lattice. Preference is here given to metal compounds which form a crystal lattice which consists of substantially planar layers. The metal complex compounds contain no intercalated compounds. But they can contain water of crystallization.

Metal complexes to be used according to the invention further include metal complexes in which a metal-containing compound, for example a salt or another metal complex, is incorporated into the crystal lattice of the metal complex. In this case, in the formula (I) a portion of the metal can be replaced by other metal ions, or further metal ions can enter into a more or less pronounced interaction with the metal complex.

Preferred metal complexes of azo compounds of the formula (I) that are to be used according to the invention have a colour locus which is defined by the following ranges for the chromaticity coordinates x and y:

(The colour loci are determined on alkyd-melamine varnishes according to DIN 53 238 in which the pigments are present in a completely dispersed state.)

Preferred values are:
x=0.40 to 0.70 and at the same time y=0.15 to 0.45, preferably
x=0.45 to 0.65 and at the same time y=0.25 to 0.40, more preferably
x=0.50 to 0.60 and at the same time y=0.30 to 0.35, especially
x=0.53 to 0.57 and at the same time y=0.30 to 0.35
where $$x = \frac{X}{X+Y+Z}, \quad y = \frac{Y}{X+Y+Z},$$

where
X, Y and Z are tristimulus values.

The standardized colour system is described in Bayer Farben Revue, Sonderheft 3/2 D, 1986; p. 12–14.

The invention further provides metal complexes with an azo compound of the formula (I) or one of its tautomeric structures characterized in that the metal is selected from the group consisting of scandium (Sc), yttrium (Y), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu).

Particularly preferred metal complexes are complexes of the metals Y, Ce, Pr and Nd, each in the trivalent oxidation state, more preferably Ce, Pr and Nd, and most preferably Ce.

The azo compounds and other preferred embodiments are subject to the statements already made above with regard to the metal complexes used according to the invention.

The invention further provides a process for preparing the metal complexes according to the invention, which is characterized in that the azo compound of the formula (I), preferably in free form or as an alkali metal salt such as sodium, lithium or potassium salt, is reacted with a metal salt of the metals selected from the group consisting of scandium (Sc), yttrium (Y), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu), preferably at pH<9.

The metal salt is preferably selected from water-soluble salts, especially chlorides, bromides, acetates, nitrates, etc. Preferably used salts of the scandium group have a water solubility of more than 20 g/l and especially more than 50 g/l at 20° C.

It is also possible to use mixtures of various metal salts of the abovementioned metals with each other or with salts of other metals. The use of such salt mixtures is especially advisable for the achievement of intermediate hues for the coloured end products.

The thus obtained metal complexes according to the invention can then be isolated by filtering their aqueous suspension to obtain an aqueous presscake. This presscake can be dried by customary drying processes, for example after washing with hot water.

Useful drying processes include for example paddle drying or spray drying of appropriately aqueous slurries. The pigment can subsequently be ground.

If the metal complexes according to the invention are too harsh in texture or dispersion, they can be converted into soft-textured pigments, for example by the method described in DE 19 847 586.

The aqueous presscake is preferably spray-dried as an aqueous slurry, the slurry preferably containing ammonia and/or an inorganic or organic base.

It is likewise preferable for the metal complexes of the invention, if they have a dispersion harshness of >250, to be heat-treated in the presence of water and optionally organic solvents either at a pH of 1 to 4, preferably 1 to 3, especially 1.5 to 2.5, or at a pH of 9 to 13, preferably 10 to 11, and at a temperature of 80 to 180° C., preferably 90 to 140° C., especially 95 to 110° C.

The heat treatment is preferably complete when the metal complex of the invention has a dispersion harshness of less than 250.

The invention therefore also provides for the inventive metal complexes having a dispersion harshness of less than 250 (measured on the lines of DIN 53 775 Part 7), the cold rolling temperature being 25° C. and the hot rolling temperature 150° C.

The metal complexes of an azo compound of the formula (I) are herein referred to as pigments. The invention therefore also provides for pigment preparations comprising at least a pigment according to the invention and a dispersant.

Dispersants for the purposes of the present invention are substances which stabilize the pigment particles in their fine particulate form in aqueous media. Finely particulate is preferably understood as meaning a fine division of 0.001 to 5 µm, especially of 0.005 to 1 µm, particularly preferably of 0.005 to 0.5 µm.

The pigment preparations are preferably solid preparations, which are preferably present in pulverulent or granular form. Suitable dispersants are for example anionic, cationic, amphoteric or non-ionic.

Suitable anionic dispersants are in particular condensation products of aromatic sulphonic acids with formaldehyde, such as condensation products of formaldehyde and alkylnaphthalenesulphonic acids or of formaldehyde, naphthalenesulphonic acids and/or benzenesulphonic acids, condensation products of optionally substituted phenol with formaldehyde and sodium bisulphite. Also suitable are dispersants from the group of the sulphosuccinic esters and alkylbenzenesulphonates. Also sulphated, alkoxylated fatty acid alcohols or salts thereof. Alkoxylated fatty acid alcohols are to be understood as meaning in particular those $C_6$–$C_{22}$ fatty acid alcohols which are provided with 5 to 120, preferably 5 to 60, especially with 5 to 30, ethylene oxide and are saturated or unsaturated, especially stearyl alcohol. Particular preference is given to a stearyl alcohol alkoxylated with 8 to 10 ethylene oxide units. The sulphated alkoxylated fatty acid alcohols are preferably present as salts, especially as alkali metal or amine salts, preferably as diethylamine salt. Also suitable in particular are ligninsulphonates, for example those which are obtained by the sulphite or kraft process. Preferably they are products which are partially hydrolyzed, oxidized, propoxylated, sulphonated, sulphomethylated or desulphonated and fractionated according to known processes, for example according to the molecular weight or according to the degree of sulphonation. Mixtures of sulphite and kraft ligninsulphonates are likewise very effective. Of particular suitability are lignin-sulphonates having an average molecular weight between 1000 and 100,000, an active ligninsulphonate content of not less than 80% and preferably a low level of polyvalent cations. The degree of sulphonation can vary widely.

Examples of useful non-ionic dispersants are reaction products of alkylene oxides with alkylatable compounds, for example fatty alcohols, fatty amines, fatty acids, phenols, alkylphenols, arylalkylphenols, such as styrene-phenol condensates, carboxamides and resin acids. They are for example ethylene oxide adducts from the class of the reaction products of ethylene oxide with:

a1) saturated and/or unsaturated fatty alcohols of 6 to 22 carbon atoms or b1) alkylphenols having 4 to 12 carbon atoms in the alkyl radical or c1) saturated and/or unsaturated fatty amines of 14 to 20 carbon atoms or d1) saturated and/or unsaturated fatty acids of 14 to 20 carbon atoms or e1) hydrogenated and/or unhydrogenated resin acids.

Suitable ethylene oxide adducts are in particular the alkylatable compounds mentioned under a1) to e1) when combined with 5 to 120, especially 5 to 100, especially 5 to 60, particularly preferably 5 to 30, mol of ethylene oxide.

Suitable dispersants also include the esters of the alkoxylation product of the formula (X) known from DE-A 19 712 486, which has an earlier priority date, or from DE-A 19 535 246, which conform to the formula (XI) and also these optionally mixed together with the parent compounds of the formula (X). The alkoxylation product of a styrene-phenol condensate of the formula (X) is as hereinbelow defined:

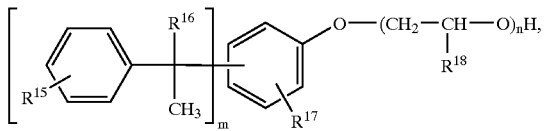

(X)

where $R^{15}$ is hydrogen or $C_1$–$C_4$-alkyl, $R^{16}$ is hydrogen or $CH_3$, $R^{17}$ is hydrogen, $C_1$–$C_4$-alkyl, $C_1$–$C_4$-alkoxy, $C_1$–$C_4$-alkoxycarbonyl or phenyl, m is from 1 to 4, n is from 6 to 120, $R^{18}$ is identical or different for each unit with the index n and represents hydrogen, $CH_3$ or phenyl subject to the proviso that, in the case of $CH_3$ being present in the various —($-CH_2-CH(R^{18})-O-$) groups, $R^{18}$ is $CH_3$ in 0 to 60% of the total value of n and is hydrogen in 100 to 40% of the total value of n and in the case of phenyl being present in the various —($-CH_2-CH(R^{18})-O-$) groups, $R^{18}$ is phenyl in 0 to 40% of the total value of n and is hydrogen in 100 to 60% of the total value of n.

Esters of alkoxylation products (X) conform to the formula (XI)

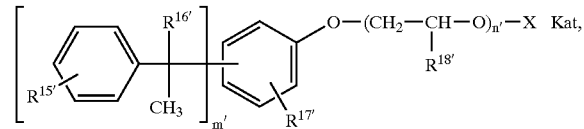

(XI)

where $R^{15'}$, $R^{16'}$, $R^{17'}$, $R^{18'}$, m' and n' assume the scope of meaning of $R^{15}$, $R^{16}$, $R^{17}$, $R^{18}$, m and n, respectively, but independently thereof, X is —$SO_3$, —$SO_2$, —$PO_3$ or —CO—($R^{19}$)—COO, Kat is a cation selected from the group consisting of H, Li, Na, K, $NH_4$ and HO—$CH_2CH_2$—$NH_3$, subject to the proviso that in the case of X=—$PO_3$ two cations are present, and $R^{19}$ is a divalent aliphatic or aromatic radical, preferably $C_1$–$C_4$-alkylene, especially ethylene, monounsaturated $C_2$–$C_4$ radicals, especially acetylene, or optionally substituted phenylene, especially orthophenylene, preferred substituents being $C_1$–$C_4$-alkyl, $C_1$–$C_4$-alkoxy, $C_1$–$C_4$-alkoxycarbonyl or phenyl.

Specific individual compounds of the formula (XI) are known for example from DE-A 19 712 486 and mixtures of the formulae (X) and (XI) for example from DE-A-19 535 256, which each form part of this application.

A preferred dispersant is the compound of the formula (XI). Preferably a compound of the formula (XI) where X is a radical of the formula —CO—($R^{19}$)—COO$^-$ and $R^{19}$ is as defined above.

Preference for use as dispersant is likewise given to a compound of the formula (XI) used together with a compound of the formula (X). In this case, the dispersant preferably contains 5 to 99% by weight of the compound (XI) and 1 to 95% by weight of the compound (X).

Polymeric dispersants are for example water-soluble and also water-emulsifiable compounds, for example homo- and copolymers such as random or block copolymers.

Particularly preferred polymeric dispersants are for example AB, BAB and ABC block copolymers. In the AB or BAB block copolymers, the A segment is a hydrophobic homopolymer or copolymer which provides a bond to the pigment and the B block is a hydrophilic homopolymer or copolymer or a salt thereof and ensures dispersal of the pigment in an aqueous medium. Such polymeric dispersants and their synthesis are known for example from EP-A-518 225 and EP-A-556 649.

The dispersant is preferably used in an amount of 0.1 to 100% by weight, especially 0.5 to 60% by weight, based on the pigment used in the pigment preparation.

The preparation may contain further additives, of course. For instance, additives which reduce the viscosity of an aqueous suspension and increase the solids content, such as the abovementioned carboxamides and sulphonamides, can be added in an amount of up to 10% by weight, based on the preparation.

Examples of further additives are inorganic and organic bases and also additives customary for pigment preparation. Suitable bases are alkali metal hydroxides, for example NaOH or KOH, organic amines such as alkylamines, especially alkanolamines or alkylalkanolamines.

Particular preference is given to methylamine, dimethylamine, trimethylamine, ethanolamine, n-propanolamine, n-butanolamine, diethanolamine, triethanolamine, methylethanolamine or dimethylethanolamine.

Examples of suitable carboxamides and sulphonamides are urea and substituted ureas such as phenylurea, dodecylurea and others; heterocycles such as barbituric acid, benzimidazolone, benzimidazolone-5-sulphonic acid, 2,3-dihydroxyquinoxaline, 2,3-dihydroxyquinoxaline-6-sulphonic acid, carbazole, carbazole-3,6-disulphonic acid, 2-hydroxyquinoline, 2,4-dihydroxyquinoline, caprolactam, melamine, 6-phenyl-1,3,5-triazine-2,4-diamine, 6-methyl-1,3,5-triazine-2,4-diamine, cyanuric acid.

The base is optionally present in up to an amount of 20% by weight, preferably up to 10% by weight, based on the pigment.

But it is particularly preferable for the preparation of the invention to contain more than 90%, especially more than 95%, preferably more than 97%, by weight of pigment according to the invention, dispersant and optionally base.

The invention further provides a process for preparing the pigment preparation of the invention, characterized in that pigment and dispersant and optionally further additives are mixed.

The invention is further illustrated but is not intended to be limited by the following examples in which all parts and percentages are by weight unless otherwise specified.

EXAMPLES

Example 1

0.19 mol of cyaniminoazobarbituric acid (65.4 g) is introduced into 1 500 g of water, admixed with 0.11 mol of La(NO$_3$) in the form of an aqueous solution and heated to 97° C. at pH=2. This is followed by stirring at 97° C. for 3 h. The product is then isolated on a suction filter, dried at 80° C. in a vacuum drying cabinet and ground for about 2 minutes in a customary laboratory mill.

The thus obtained pigment powder is dispersed according to DIN 53 238 in an alkyd-melamine varnish system and produces a brilliant and light-fast varnish of high colour strength.

Colour locus (full shade): X=23.4 Y=14.0 Z=5.7

Example 1a

Example 1 is repeated. The pigment powder obtained is incorporated in an aqueous casein binder formulation.

Colour locus (full shade): X=48.4 Y=36.2 Z=17.3

The binder formulation is incorporated in admixture with yellow colorants for the production of heat-stable and light-fast beechwood laminate.

Example 2

0.19 mol of cyaniminoazobarbituric acid (65.4 g) is introduced into 1 500 g of water, admixed with 0.11 mol of La(NO$_3$)$_3$ in the form of an aqueous solution and heated to 97° C. at pH=4. This is followed by stirring at 97° C. for 3 h. The product is then isolated on a suction filter, dried at 80° C. in a vacuum drying cabinet and ground for about 2 minutes in a customary laboratory mill.

The thus obtained pigment powder is dispersed according to DIN 53 238 in an alkyd-melamine varnish system and produces a brilliant and light-fast varnish of high colour strength.

Colour locus (full shade): X=25.0 Y=14.6 Z=5.6

Example 2a

Example 2 is repeated. The pigment powder obtained is incorporated in an aqueous casein binder formulation and used for the purpose indicated in Example 1a.

Colour locus (full shade): X=50.1 Y=37.4 Z=17.5

Example 3

0.19 mol of cyaniminoazobarbituric acid (65.4 g) is introduced into 1 500 g of water, admixed with 0.2 mol of La(NO$_3$)$_3$ in the form of an aqueous solution and heated to 97° C. at pH=7. This is followed by stirring at 97° C. for 3 h. The product is then isolated on a suction filter, dried at 80° C. in a vacuum drying cabinet and ground for about 2 minutes in a customary laboratory mill.

The thus obtained pigment powder is dispersed according to DIN 53 238 in an alkyd-melamine varnish system and produces a brilliant and light-fast varnish of high colour strength.

Colour locus (full shade): X=23.6 Y=14.5 Z=5.2

Example 3a

Example 3 is repeated. The pigment powder obtained is incorporated in an aqueous casein binder formulation and used for the purpose indicated in Example 1a.

Colour locus (full shade): X=55.0 Y=45.6 Z=10.1

Example 4

0.19 mol of cyaniminoazobarbituric acid (65.4 g) is introduced into 1 500 g of water. The batch is heated to 97° C. 0.11 mol of $CeCl_3$ in the form of an aqueous solution is added dropwise over 30 min, during which the pH is maintained with KOH solution at pH=3. This is followed by 5 hours of stirring at pH=3 and 97° C. The product is then isolated on a suction filter, dried at 80° C. in a vacuum drying cabinet and ground for about 2 minutes in a customary laboratory mill.

The thus obtained pigment powder is dispersed according to DIN 53 238 in an alkyd-melamine varnish system and produces a brilliant and light-fast varnish of high colour strength.

Colour locus (full shade): X=22.8 Y=13.5 Z=5.5

Example 4a

Example 4 is repeated. The pigment powder obtained is incorporated in an aqueous casein binder formulation and used for the purpose indicated in Example 1a.

Colour locus (full shade): X=43.6 Y=29.6 Z=10.1

Example 5

0.19 mol of cyaniminoazobarbituric acid (65.4 g) is introduced into 1 500 g of water. The batch is heated to 97° C. 0.11 mol of $CeCl_3$ in the form of an aqueous solution is added dropwise over 30 min, during which the pH is maintained with KOH solution at pH=4. This is followed by 5 hours of stirring at pH=4 and 97° C. The product is then isolated on a suction filter, dried at 80° C. in a vacuum drying cabinet and ground for about 2 minutes in a customary laboratory mill.

The thus obtained pigment powder is dispersed according to DIN 53 238 in an alkyd-melamine varnish system and produces a brilliant and light-fast varnish of high colour strength.

Colour locus (full shade): X=23.4 Y=13.8 Z=5.5

Example 5a

Example 4 is repeated. The pigment powder obtained is incorporated in an aqueous casein binder formulation and used for the purpose indicated in Example 1a.

Colour locus (full shade): X=44.0 Y=29.8 Z=9.8

Example 5b

Synthesis, drying and grinding is carried out as in Example 5. The pigment powder thus obtained is incorporated in PVC-P according to DIN 53 775 Part 7.

Dispersion harshness: 270

Example 5c 0.19 mol of cyaniminoazobarbituric acid (65.4 g) is introduced into 1 500 g of water. The batch is heated to 97° C. 0.11 mol of $CeCl_3$ in the form of an aqueous solution is added dropwise over 30 min, during which the pH is maintained with KOH solution at pH=4. This is followed by 5 hours of stirring at pH=4 and 97° C. This is followed by adjustment with hydrochloric acid to pH 1.5 and stirring at 98° C. for 6 hours. Thereafter, KOH solution is used to set pH 4 before the product is isolated on a suction filter, dried at 80° C. in a vacuum drying cabinet and ground for about 2 min in a customary laboratory mill.

The pigment powder thus obtained is incorporated in PVC-P according to DIN 53 775 Part 7.

Dispersion harshness: 105.

Example 6

0.19 mol of cyaniminoazobarbituric acid (65.4 g) is introduced into 1 500 g of water. The batch is heated to 97° C. 0.11 mol of $CeCl_3$ in the form of an aqueous solution is added dropwise over 30 min, during which the pH is maintained with KOH solution at pH=5. This is followed by 5 hours of stirring at pH=5 and 97° C. The product is then isolated on a suction filter, dried at 80° C. in a vacuum drying cabinet and ground for about 2 minutes in a customary laboratory mill.

The thus obtained pigment powder is dispersed according to DIN 53 238 in an alkyd-melamine varnish system and produces a brilliant varnish of high colour strength.

Colour locus (full shade): X=23.4 Y=14.0 Z=5.6

Example 6a

Example 4 is repeated. The pigment powder obtained is incorporated in an aqueous casein binder formulation and used for the purpose indicated in Example 1.

Colour locus (full shade): X=44.3 Y 29.9 Z=8.6

Example 7

0.19 mol of cyaniminoazobarbituric acid (65.4 g) is introduced into 1 500 g of water. The batch is heated to 97° C. 0.11 mol of $NdCl_3$ in the form of an aqueous solution is added dropwise over 30 min, during which the pH is maintained with KOH solution at pH=2. This is followed by 5 hours of stirring at pH=2 and 97° C. The product is then isolated on a suction filter, dried at 80° C. in a vacuum drying cabinet and ground for about 2 minutes in a customary laboratory mill.

The thus obtained pigment powder is dispersed according to DIN 53 238 in an alkyd-melamine varnish system and produces a brilliant and light-fast varnish of high colour strength.

Colour locus (full shade): X=23.3 Y=13.8 Z=5.6

Example 7a

Example 7 is repeated. The pigment powder obtained is incorporated in an aqueous casein binder formulation and used for the purpose indicated in Example 1.

Colour locus (full shade): X=43.8 Y=29.8 Z=10.5

Example 8

0.19 mol of cyaniminoazobarbituric acid (65.4 g) is introduced into 1 500 g of water. The batch is heated to 97° C. 0.11 mol of $NdCl_3$ in the form of an aqueous solution is added dropwise over 30 min, during which the pH is maintained with KOH solution at pH=4. This is followed by 5 hours of stirring at pH=4 and 97° C. The product is then isolated on a suction filter, dried at 80° C. in a vacuum drying cabinet and ground for about 2 minutes in a customary laboratory mill.

The thus obtained pigment powder is dispersed according to DIN 53 238 in an alkyd-melamine varnish system and produces a brilliant and light-fast varnish of high colour strength.

Colour locus (full shade): X=25.7 Y=15.2 Z=5.6

Example 8a

Example 8 is repeated. The pigment powder obtained is incorporated in an aqueous casein binder formulation and used for the purpose indicated in Example 1a.

Colour locus (full shade): X=44.0 Y=29.1 Z=8.4

Example 9

0.19 mol of cyaniminoazobarbituric acid (65.4 g) is introduced into 1 500 g of water. The batch is heated to 97° C. 0.2 mol of $NdCl_3$ in the form of an aqueous solution is added dropwise over 30 min, during which the pH is maintained with KOH solution at pH=6. This is followed by 5 hours of stirring at pH=6 and 97° C. The product is then isolated on a suction filter, dried at 80° C. in a vacuum drying cabinet and ground for about 2 minutes in a customary laboratory mill.

The thus obtained pigment powder is dispersed according to DIN 53 238 in an alkyd-melamine varnish system and produces a brilliant and light-fast varnish of high colour strength.

Colour locus (full shade): X=26.8 Y=16.2 Z=5.2

Example 9a

Example 9 is repeated. The pigment powder obtained is incorporated in an aqueous binder formulation and used for the purpose indicated in Example 1a.

Colour locus (full shade): X=64.2 Y=54.4 Z=19.2

Example 10

Preparation of an Organic Dispersion for LCD 9 kg of powder of a product made according to Example 3 are combined with 12 kg of methoxypropyl acetate and 4.5 kg of a dispersant such as for example Solsperse 38500 (from Avecia) in a dissolver at 3 000 rpm and stirred for 3 h. This dispersion is then ground in 5 passes on an LMJ-2 type Netzch mill using zirconium oxide beads of 0.4–0.7 mm. This dispersion of the lanthanum salt is mixed into an alkyd-melamine varnish and measured according to DIN 53238.

The dispersion is used as a strong, brilliant and light-fast shading component in the red dots of LCDs.

Colour locus: X=22 Y=15 Z=5.2

Example 11

Preparation of an Aqueous Dispersion for Pigmenting Laminate 428 g of a 35% presscake according to Example 3 are combined with 222 g of deionized water, 30 g of a sodium salt of a naphthalenesulphonic acid formaldehyde condensate such as for example Tamol NNO from BASF and 30 g of a high molecular weight block copolymer having groups with affinity for pigment, such as for example BYK 184 (BYK Chemie) in a dissolver at 3000 rpm and stirred for 1 hour. The dispersion is ground in 4 passes on a laboratory bead mill using 0.4–0.7 mm zirconium oxide beads. The dispersion is incorporated in an aqueous binder, drawn down and measured for colour. The colour strength is 120% based on pigment powder.

Colour locus: X=23 Y=14.5 Z=5

This dispersion was used in admixture with yellow colorants for the production of heat-stable and light-fast beechwood laminate.

Example 12

Preparation of a Pigment Ink in the Cerium Salt of Cyaniminoazobarbituric Acid

Grinding of Pigment:

364 g of deionized water, 15 g of a sodium salt of a naphthalenesulphonic acid-formaldehyde condensate such as Tamol NH 8807, 10 g of an emulsifier such as Emulgator PD from Bayer AG, 1 g of a defoamer such as Surfinol E-104 from Air Products and 250 ml of zirconium oxide beads having a diameter of 0.4–0.6 mm are introduced into a bead mill. As soon as the mixture has become homogeneous, 75 g of the cerium salt of cyaniminoazobarbituric acid, prepared according to Example 4, are sprinkled in and ground in for 1 hour. The dispersion is filtered through a 50 μm sieve.

Preparation of Ink:

7.95 g of deionized water, 3.75 g of 1,5-pentenediol, 2.5 g of polyethylene glycol 200, 1.25 g of N-methylpyrrolidone are introduced as initial charge and mixed with 8.3 g of the pigment dispersion. This ink is filtered through a 5 μm filter and printed up in an HP 890 inkjet printer. The colour locus on premium paper is: X=23.5; Y=15.5; Z=5.

Tamol is a commercial product of BASF AG

Emulgator PD is a commercial product of Bayer AG

Surfinol E 104 is a commercial product of Air Products

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Metal complexes conforming to complexes of metals with an azo compound of the formula (I) or its tautomeric structures

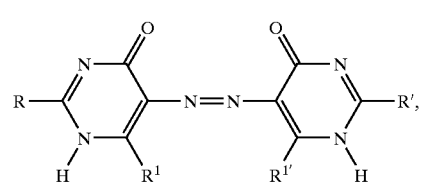

(I)

where

R is OH, $NH_2$, NH—CN, arylamino or acylamino,

R' is $NH_2$, NH—CN, arylamino or acylamino and $R^1$ and $R^{1'}$ are independently —OH or —$NH_2$, wherein the metal is selected from the group consisting of scandium (Sc), yttrium (Y), cerium (Ce), praseodymlum (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu), wherein the metal complexes of the scandium group include two azo units per metal atom (2:1 complexes).

2. Metal complexes according to claim 1, wherein the azo compound conforms to the formula (I), to the formula (IIa) or (IIb) or to a tautomeric form thereof

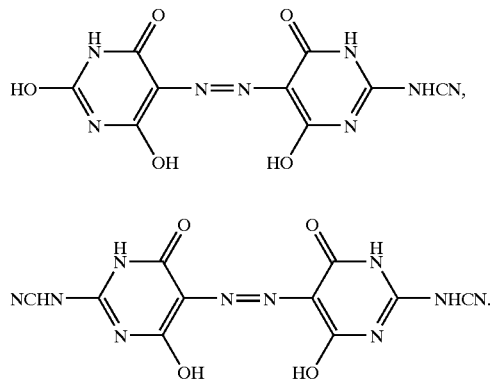

3. Metal complexes of the general formulae (IIIa) and (IIIb)

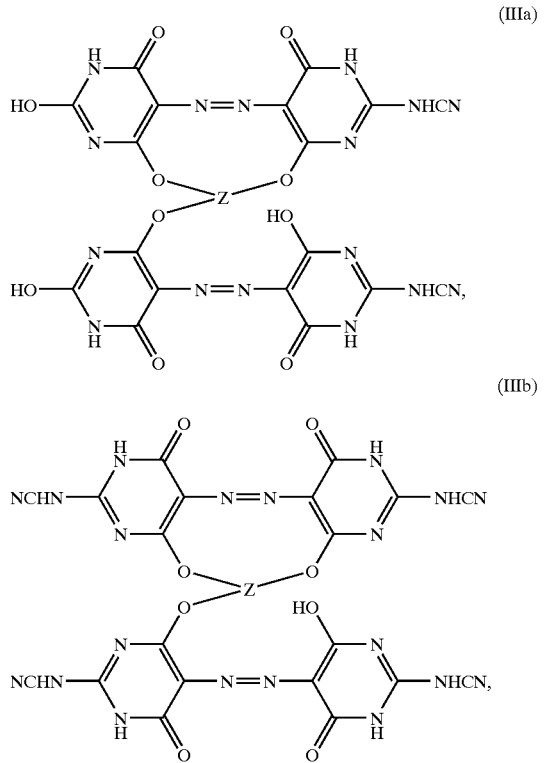

where
Z is a metal selected from the group consisting of the metals scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu).

4. Metal complexes according to claim 3, wherein
Z is a metal selected from the group consisting at the metals yttrium (Y), lanthanum (La), cerium (Ce), praseodymium (Pr) and neodymium (Nd).

5. Metal complexes according to claim 4, wherein Z is a metal selected from the group consisting of cerium (Ce), praseodymium (Pr) and neodymium (Nd).

6. Metal complexes according to claim 3, which conform to the formula (IIIc) or to one of its tautomoric structures

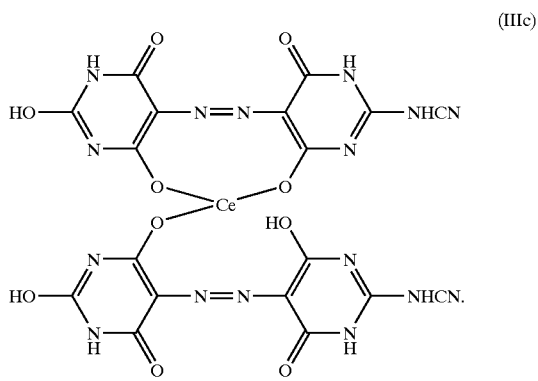

7. Metal complexes of the scandium group according to claim 1, wherein their colour locus is defined by the following chromaticity coordinates x and y:

x=0.40 to 0.70 y=0.50 to 0.45.

8. Motel complexes of the scandium group according to claim 3, wherein their colour locus is defined by the following chromaticity coordinates x and y:

x=0.40 to 0.70 y=0.15 to 0.45.

9. Metal complexes of the scandium group according to claim 1, having a dispersion harshness of less than 250.

10. Metal complexes of the scandium group according to claim 3, having a dispersion harshness of less than 250.

11. Process for preparing the metal complexes according to claim 1, comprising complexing azo compounds of the formula (I)

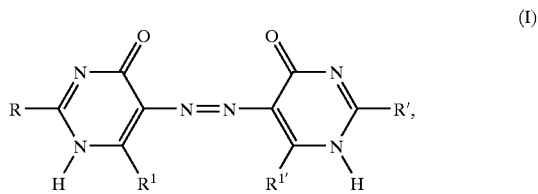

where

R is OH, NH$_2$, NH—CN, arylamino or acylamino,

R' is NH$_2$, NH—CN, arylamino or acylamino and

R$^1$ and R$^{1'}$ are independently —OH or —NH$_2$, with a metal salt of the scandium group.

12. Process for preparing the metal complexes according to claim 3, comprising complexing azo compounds of the formula (I)

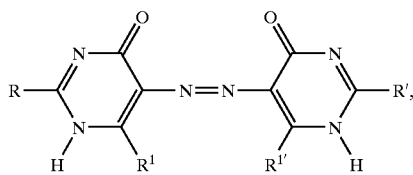

(I)

where
- R is OH, NH$_2$, NH—CN, arylamino or acylamino,
- R' is NH$_2$, NH—CN, arylamino or acylamino and
- R$^1$ and R$^{1'}$ are independently —OH or —NH$_2$, with a metal salt of the scandium group.

13. Pigment preparation comprising as pigment at least one metal complex according to claim 1, and at least one dispersant.

14. Pigment preparation comprising as pigment at least one metal complex according to claim 3, and at least one dispersant.

15. Process for preparing the pigment preparation according to claim 13, comprising mixing at least one metal complex conforming to complexes of metals with an azo compound of the formula (I) or its tautomeric structures

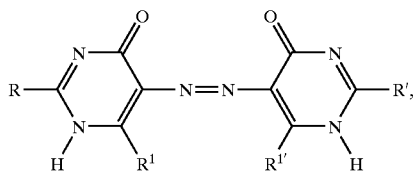

(I)

where
- R is OH, NH$_2$, NH—CN, arylamino or acylamino,
- R' is NH$_2$, NH—CN, arylamino or acylamino and
- R$^1$ R$^{1'}$ independently —OH or —NH$_2$,
- wherein the metal is selected from the group consisting of scandium (Sc), yttrium (Y), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu) as pigment, and at least one dispersant.

16. Process for preparing the pigment preparation according to claim 14, comprising mixing at least one metal complex of the general formulae (IIIa) and (IIIb)

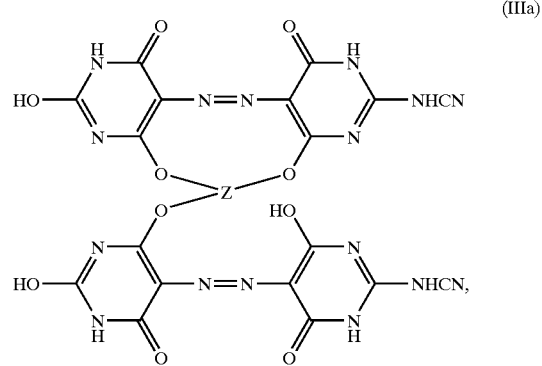

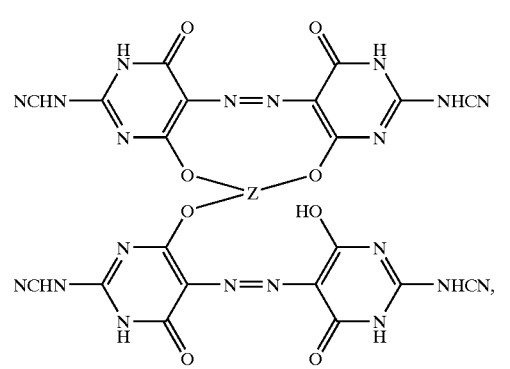

where
- Z is a metal selected from the group consisting of the metals scandium (So), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu) as pigment, and at least one dispersant.

* * * * *